United States Patent
Luz et al.

(10) Patent No.: US 6,754,193 B2
(45) Date of Patent: Jun. 22, 2004

(54) METHOD AND BASE STATION CONTROLLER FOR OPERATING IN ACCORDANCE WITH A WIRELESS COMMUNICATION PROTOCOL

(75) Inventors: Yuda Y. Luz, Buffalo Grove, IL (US); Keith TenBrook, Crystal Lake, IL (US); Dan DeClerck, Lake Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 127 days.

(21) Appl. No.: 10/210,671

(22) Filed: Aug. 1, 2002

(65) Prior Publication Data

US 2004/0022265 A1 Feb. 5, 2004

(51) Int. Cl.[7] ................................................ H04Q 7/00
(52) U.S. Cl. ........................ 370/331; 370/466; 455/436
(58) Field of Search ................................. 370/328, 329, 370/331, 332, 333, 341, 465, 466, 467; 455/422, 436, 437, 439, 442, 443, 444

(56) References Cited

U.S. PATENT DOCUMENTS

| 5,574,973 | A | * | 11/1996 | Borth et al. .............. 455/435.2 |
|---|---|---|---|---|
| 5,737,703 | A | | 4/1998 | Byrne |
| 5,841,985 | A | * | 11/1998 | Jie et al. ..................... 709/227 |
| 5,999,815 | A | | 12/1999 | TenBrook et al. |
| 6,298,232 | B1 | * | 10/2001 | Marin et al. ................. 455/413 |
| 2002/0004411 | A1 | * | 1/2002 | Heppe et al. ............... 455/552 |
| 2002/0071404 | A1 | * | 6/2002 | Park et al. ................... 370/331 |
| 2002/0167906 | A1 | * | 11/2002 | La Porta et al. ........... 370/252 |
| 2002/0173272 | A1 | * | 11/2002 | Liang et al. ................. 455/63 |
| 2003/0017842 | A1 | * | 1/2003 | Moles et al. ................ 455/552 |
| 2003/0128685 | A1 | * | 7/2003 | Mahany et al. ............ 370/338 |

* cited by examiner

Primary Examiner—Ajit Patel
(74) Attorney, Agent, or Firm—Marshall, Gerstein & Borun LLP

(57) ABSTRACT

A method (700) and a base station controller (120) for operating in accordance with a wireless communication protocol are described herein. In a wireless communication system (100), the base station controller (120) may detect that the mobile station (160) is operable in accordance with the wireless communication protocol based on information associated with the mobile station. In response to detecting at least one of condition of the system (100) suggesting a potential for improved system performance, the base station controller (120) may transmit a handoff message from the first base station (140) to the mobile station (160). The handoff message may notify the mobile station (160) to operate in accordance with the wireless communication protocol.

27 Claims, 3 Drawing Sheets

METHOD AND BASE STATION CONTROLLER FOR OPERATING IN ACCORDANCE WITH A WIRELESS COMMUNICATION PROTOCOL

TECHNICAL FIELD

The present disclosure relates to wireless communication systems, and more particularly, to a method and a base station for operating in accordance with a wireless communication protocol.

BACKGROUND

A wireless communication system is a complex network of systems and elements. Typical systems and elements include (1) a radio link to mobile stations (e.g., a cellular telephone or a subscriber equipment used to access the wireless communication system), which is usually provided by at least one and typically several base stations, (2) communication links between the base stations, (3) a controller, typically one or more base station controllers or centralized base station controllers (BSC/CBSC), to control communication between and to manage the operation and interaction of the base stations, (4) a switching system, typically including a mobile switching center (MSC), to perform call processing within the system, and (5) a link to the land line, i.e., the public switch telephone network (PSTN) or the integrated services digital network (ISDN).

A base station subsystem (BSS) or a radio access network (RAN), which typically includes one or more base station controllers and a plurality of base stations, provides all of the radio-related functions. The base station controller provides all the control functions and physical links between the switching system and the base stations. The base station controller is also a high-capacity switch that provides functions such as handover, cell configuration, and control of radio frequency (RF) power levels in the base stations.

The base station handles the radio interface to the mobile station. The base station includes the radio equipment (transceivers, antennas, amplifiers, etc.) needed to service each communication cell in the system. A group of base stations is controlled by a base station controller. Thus, the base station controller operates in conjunction with the base station as part of the base station subsystem to provide the mobile station with real-time voice, data, and multimedia services (e.g., a call).

After a call is initiated in an original cell, the mobile station may continue to scan the neighboring cells to determine if the signal from another cell becomes comparable to that of the original cell. When this happens, the switching system (e.g., MSC) indicates to the mobile station that the call has entered a new cell's coverage area and that a handoff can be initiated. The mobile station transmits a control message to the MSC, which states that the new cell site is now strong and identifies the new cell. The MSC initiates the handoff by establishing a link to the mobile station through the new cell while maintaining the old link. While the mobile station is locate in the transition region between the two cells, the call is supported by communication through both cells; thereby eliminating the ping-pong effect (i.e., repeated requests to hand the call back and forth between cells). The original cell site will only discontinue handling the call when the mobile station is firmly established in the new cell.

The cells may operate in accordance with a variety of wireless communication standards. For example, the original cell may be operable in accordance with the code division multiple access (CDMA) 2000-1X standard while the new cell may be operable in accordance with either the CDMA 2000-1X standard or the CDMA 1X-EV/DV standard. The CDMA 2000-1X standard provides wireless data packet services at 144 kilobits-per-second (kbps) whereas the CDMA 1X-EV/DV standard may provide real time voice, data, and multimedia services on a single radio frequency carrier with existing CDMA 2000 networks at data rates up to 3.07 megabits-per-second (Mbps). With the enhanced data rates provided by CDMA 1X-EV/DV standard, a user may browse the Internet, access e-mail, or transmit/receive large data files or images via a mobile station (e.g., a cellular telephone) with a wireless communication link as if the user accessed the Internet via a laptop or a desktop computer with a wired Internet connection. Further, the CDMA 1X-EV/DV may be backward compatible with other CDMA components such as IS-95A and IS-95B components. Thus, it may desirable to use the CDMA 1X-EV/DV standard when all possible.

One aspect of designing a wireless communication system is to optimize the resources available to the wireless communication system. For example, a mobile station should operate in accordance with the CDMA 1X-EV/DV standard when available because the CDMA 1X-EV/DV standard provides higher data rates and greater data capacity than the CDMA 1X standard. Therefore, a need exist to optimize communication resources by operating in accordance with the CDMA 1X-EV/DV standard.

BRIEF DESCRIPTION OF THE DRAWINGS

This disclosure will be described in terms of several embodiments to illustrate its broad teachings. Reference is also made to the attached drawings.

DETAILED DESCRIPTION

Figure 1:
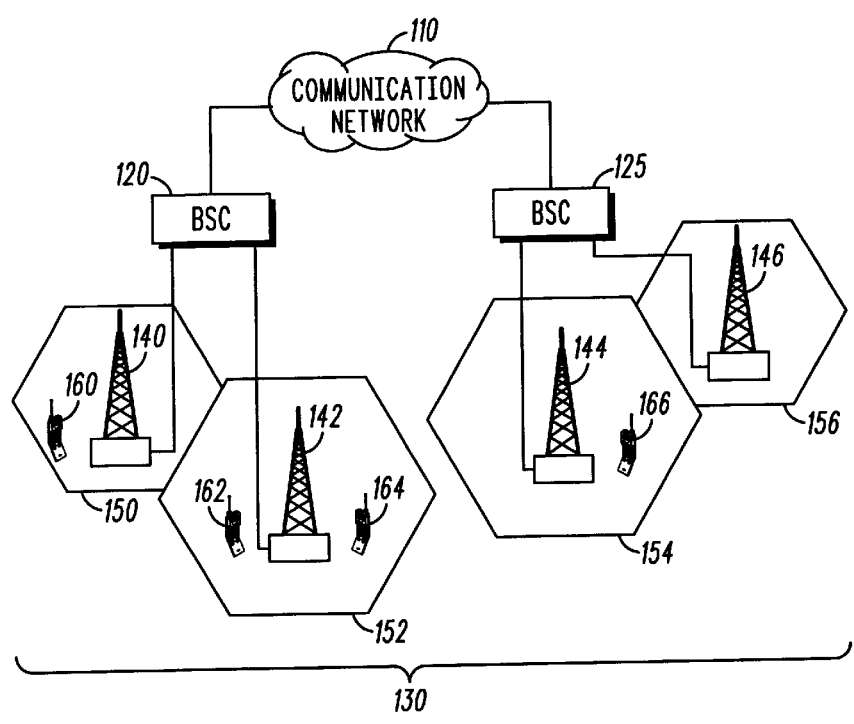
FIG. 1 is a block diagram representation of a wireless communication system.

A method and a base station controller for operating in accordance with a wireless communication protocol are described. In a wireless communication system, a mobile station may initiate a call from a first cell serviced by a first base station, and then move into a second cell serviced by a second base station. The call may be, but is not limited to, a voice call, a data call, and a multimedia call. The first base station may be operable in accordance with a first communication protocol whereas the second base station may be operable in accordance with a second communication protocol. However, the second base station may be operable in accordance with the first communication protocol as well. For example, the first base station may be operable in accordance with the code division multiple access (CDMA) 2000 1X communication protocol, and the second base station may be operable in accordance with either the CDMA 2000 1X communication protocol or the CDMA 1X-EV/DV communication protocol. A base station controller may determine whether the mobile station is operable in accordance with the second communication protocol based on information associated with the mobile station. For example, the base station controller may detect that the mobile station is operable in accordance with the second communication protocol based on a device identifier associated with the mobile station. In particular, the device identifier may be stored within a home location register (HLR), a status message, or a message associated with a service negotiation (e.g., service negotiation between the mobile station and the second base station). If the base station controller detects that the mobile station is operable in accordance with the second communication protocol then the base station controller may detect for at least one condition of the wireless communication system suggesting a potential for improved system performance by operating in accordance with the second communication protocol. That is, the base station controller may detect a condition of the wireless communication system suggesting a potential for an increase in communication resources available. For example, more Walsh codes may be available in response to the mobile station operating in accordance with the second communication protocol. The base station controller may also detect a condition of the wireless communication system suggesting a potential for a reduction in interference. In particular, the aggregate forward power given to the mobile station may be reduced by the mobile station operating in accordance with the second communication protocol. Further, the base station controller may detect a condition of the mobile station suggesting a potential for an increase in data throughput (i.e., quality of service). Upon detecting at least one condition of the wireless communication system suggesting a potential for improved system performance by operating in accordance with the second communication protocol, the base station controller may transmit a notification message from the first base station to the mobile station via a communication channel. In particular, the notification message may notify the mobile station to operate in accordance to the second communication protocol. For example, the base station controller may transmit a handoff message from the first base station via a forward dedicated control channel (F-DCCH) to the mobile station. As a result, the mobile station and the second base station may operate in accordance with the second communication protocol to improve system performance.

A communication system in accordance with the present invention is described in terms of several preferred embodiments, and particularly, in terms of a wireless communication system operating in accordance with at least one of several standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the IS-55 Time Division Multiple Access (TDMA) digital cellular, the IS-95 Code Division Multiple Access (CDMA) digital cellular, CDMA 2000, the Personal Communications System (PCS), 3G, the Universal Mobile Telecommunications System (UMTS) and variations and evolutions of these protocols. As shown in FIG. 1, a wireless communication system 100 includes a core network (CN) 110, a plurality of base station controllers (BSC), generally shown as 120 and 125, servicing a total service area 130. As is known for such systems, each BSC 120 and 125 has associated therewith a plurality of base stations (BS), generally shown as 140, 142, 144, and 146, servicing communication cells, generally shown as 150, 152, 154, and 156, within the total service area 130. The BSCs 120 and 125, and base stations 140, 142, 144, and 146 are specified and operate in accordance with the applicable standard or standards for providing wireless communication services to mobile stations (MS), generally shown as 160, 162, 164, and 166, operating in communication cells 150, 152, 154, and 156, and each of these elements are commercially available from Motorola, Inc. of Schaumburg, Ill.

Figure 2:
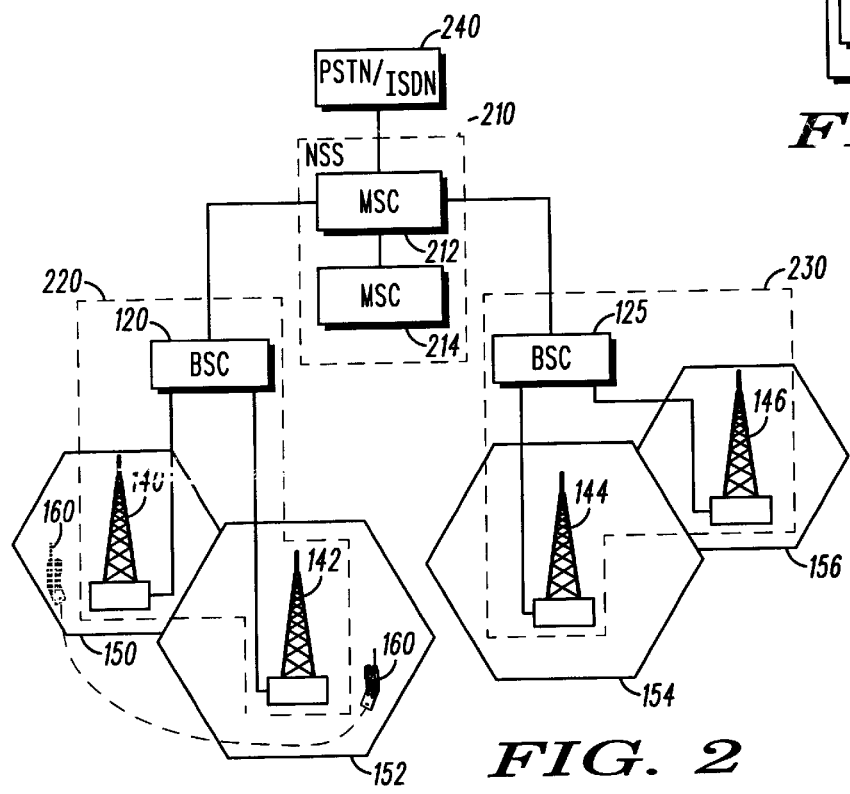
FIG. 2 is a block diagram representation of a handoff.

Referring to FIG. 2, the communication network 110 generally includes a switching system, typically one or more network subsystems (NSS) 210, performing call processing within the wireless communication system 100. The network subsystem 210 generally includes a home location register (HLR) 212 and a mobile switching center (MSC) 214. The HLR 214 is a database of subscriber profiles such as name and address of users, assigned telephone number, services subscribed (e.g., voice-mail, caller ID, call waiting), serial number of subscriber equipments (e.g., serial number of mobile stations), etc. The MSC 212 is an interface between typically one or more base station subsystems (BSS), generally shown as 220 and 230, and other communication networks 240 such as the public switch telephone network (PSTN) and the integrated services digital network (ISDN). Each base station subsystem 230 and 240 has associated therewith a base station controller and a plurality of base stations. For example, the base station subsystem 230 may include the base station controller 120 and the base stations 142, 144, and the base station subsystem 240 may include the base station controller 125 and the base stations 144, 146.

After a call is initiated by a mobile station within a cell, the mobile station may move away from that cell. As shown in FIG. 2, for example, the mobile station 160 may initiate a call within a first communication cell 150 and then move into a second communication cell 152. A handoff may occur to switch coverage responsibility of the on-going call from one base station to another when the mobile station 160 moves from one cell to another. Accordingly, the BSC 120 may switch coverage responsibility from a first base station 140 to a second base station 142 when the mobile station 160 moves from the first cell 150 to the second cell 152. In particular, the first base station 140 may be operable in accordance with a first wireless communication protocol and the second base station 142 may be operable in accordance with a second wireless communication protocol. For example, the first communication protocol may be, but is not limited to, the CDMA 2000 1X communication protocol (hereinafter "1X protocol") whereas the second communication protocol may be, but is not limited to, the CDMA 1X EV/DV communication protocol (hereinafter "EV/DV protocol"). The second base station 142 may also be operable in accordance with the 1X protocol if the mobile station 160 is not operable in accordance with the EV/DV protocol. Although the embodiments disclosed herein are particularly well suited for use with the 1X protocol and the EV/DV protocol, persons of ordinary skill in the art will readily appreciate that the teachings herein are in no way limited to those communication protocols. On the contrary, persons of ordinary skill in the art will readily appreciate that the teachings can be employed with other communication protocols.

Figure 3:
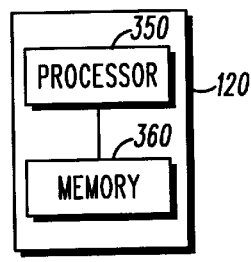
FIG. 3 is a block diagram representation of a base station controller.

Referring to FIG. 3, a base station controller (e.g., BSC 120 shown in FIG. 2) adapted to switch from the first wireless communication protocol to the second wireless communication protocol is shown. The base station controller 120 generally includes a processor 350 and a memory

360. The processor 350 is operatively coupled to the memory 360, which stores a program or a set of operating instructions for the processor 350. The processor 350 executes the program or the set of operating instructions such that the base station controller 120 operates as described herein. The program or the set of operating instructions may be embodied in a computer-readable medium such as, but not limited to, paper, a programmable gate array, an application specific integrated circuit (ASIC), an erasable programmable read only memory (EPROM), a read only memory (ROM), a random access memory (RAM), a magnetic media, and an optical media.

Figure 4:
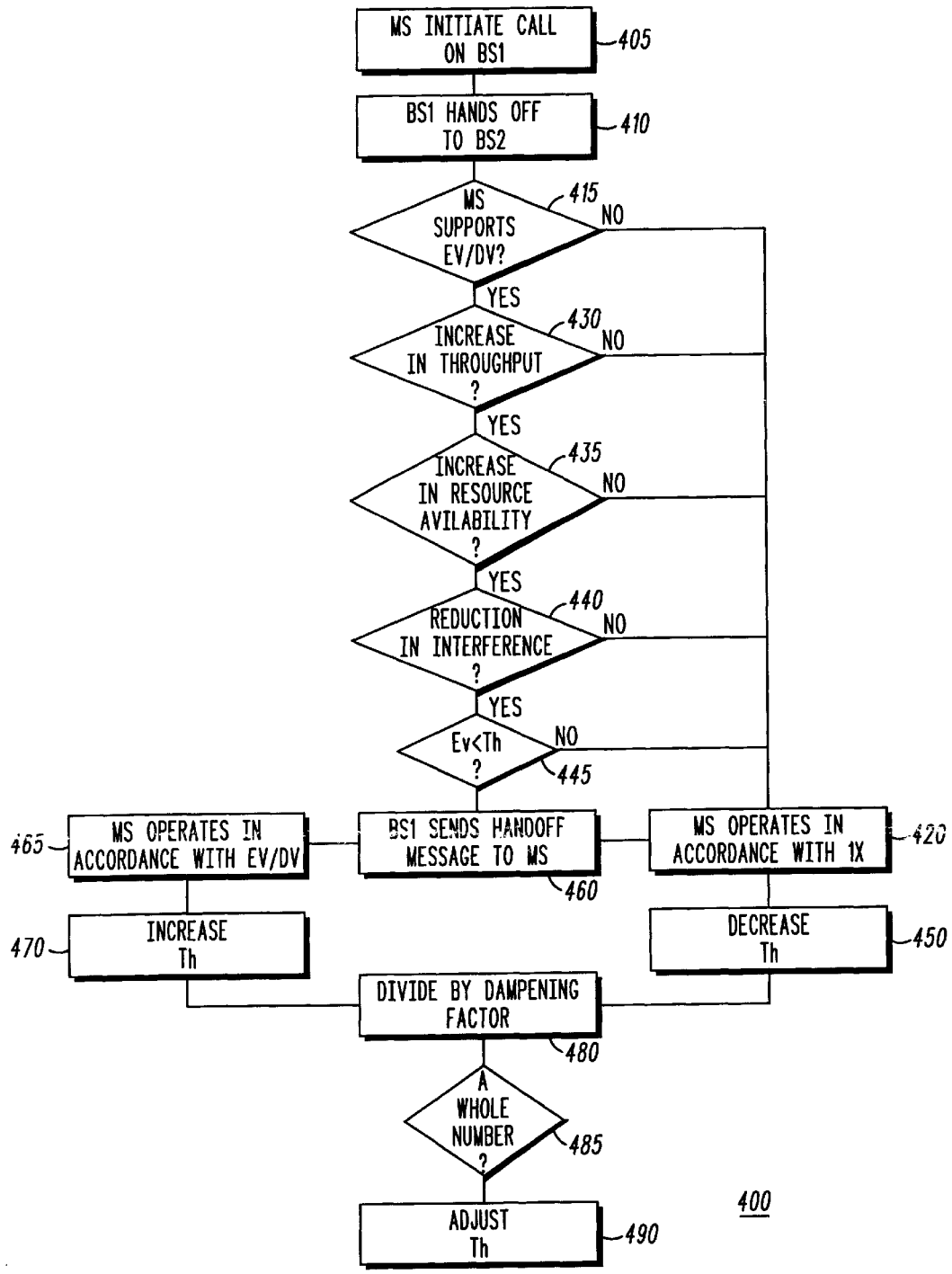
FIG. 4 is a flow diagram representation for switching from a first wireless communication protocol to a second wireless communication protocol.

As shown in FIG. 4, a basic flow 400 for switching from a first wireless communication protocol to a second wireless communication protocol that may be applied with the base station controller 120 shown in FIGS. 2 and 3 may start with the mobile station 160 initiating a call within the first cell 150 serviced by the first base station 140 operating in accordance with a first communication protocol as described above (i.e., box 405). The call may be, but is not limited to, a voice call, data call, and a multimedia call (i.e., a voice over Internet Protocol (VoIP) call). The mobile station 160 may then move into the second cell 152 serviced by the second base station 142, which may be operable in accordance with either the first communication protocol or a second communication protocol. As noted above, the first base station 140 may be operable in accordance with the 1X protocol whereas the second base station 142 may be operable in accordance with either the 1X protocol or the EV/DV protocol. After initiating the call, the mobile station 160 may move into the second cell 152, which is serviced by the second base station 142. That is, the first base station 140 in box 410 may handoff coverage responsibility of the on-going call to the second base station 142. Accordingly, the base station controller 120 in box 415 determines whether the mobile station 160 is operable in accordance with the EV/DV protocol. For example, the base station controller 120 may determine whether the mobile station 160 is operable in accordance with the EV/DV protocol based on a device identifier such as, but not limited to, an electronic serial number (ESN) associated with the mobile station 160. Persons of ordinary skill in the art will appreciate that the ESN may be a unique number assigned to a cellular telephone by the manufacturer. The base station controller 120 may retrieve the ESN associated with the mobile station 160 from the HLR 214 (i.e., the ESN may be stored with the HLR 214). In another example, the base station controller 120 may determine the mobile station 160 is operable in accordance with the EV/DV protocol via a message associated with a service negotiation between the base station 142 and the mobile station 160. Yet another example may be a status message from the mobile station 160 that indicates whether the mobile station 160 is operable in accordance with the EV/DV protocol.

If the base station controller 120 detects that the mobile station 160 is not operable in accordance with the EV/DV protocol then the mobile station 160 and the base station 142 may continue to operate in accordance with the 1X protocol as in box 420. However, if the mobile station 160 is operable in accordance with the EV/DV protocol then the base station controller 120 may determine whether the performance of the wireless communication system 100 may improved by switching from the 1X protocol over to the EV/DV protocol. To switch from operating in accordance with the 1X protocol to the EV/DV protocol, the base station controller 120 in box 430 may determine whether there is a potential for an increase in data throughput, i.e., enhance quality of service of the mobile station 160. For example, the base station controller 120 may determine whether the data rate may be sustained or increased, the amount of end-to-end delay may be reduced, and/or the amount of transmission time may be reduced. If the base station controller 120 fails to detect a potential for an increase in data throughput then the mobile station 160 and the second base station 142 may continue operate in accordance with the 1X protocol as in box 420. Otherwise, the base station controller 120 may proceed to box 435 where the base station controller 120 may monitor for a condition of the wireless communication system 100 suggesting a potential for an increase in communication resources available, i.e., the mobile station 160 uses less of Walsh codes as described in detail below. If the base station controller 120 fails to detect a potential for an increase communication resources available then the mobile station 160 and the second base station 142 may continue operate in accordance with the 1X protocol as in box 420. However, the flow 400 may advance to box 440 in response to the base station controller 120 detecting a potential for an increase in communication resources available at box 435. In box 440, the base station controller 120 may detect a potential for a reduction of interference, i.e., the aggregate forward power consumed by mobile station 160 may be reduced. Otherwise, the mobile station 160 at box 420 may continue to operate in accordance with the 1X protocol.

On the forward link (i.e., from the base station to the mobile station), both the 1X protocol and the 1X-EV/DV protocol use Walsh codes to separate multiple users on the same channel. The two CDMA protocols share a code spectrum of Walsh codes to differentiate between channels. In particular, the code spectrum includes 32 Walsh codes data packets and 128 Walsh codes for data and/or voice packets. As a result, the code spectrum may need to be partitioned between the two CDMA protocols.

Figure 5:
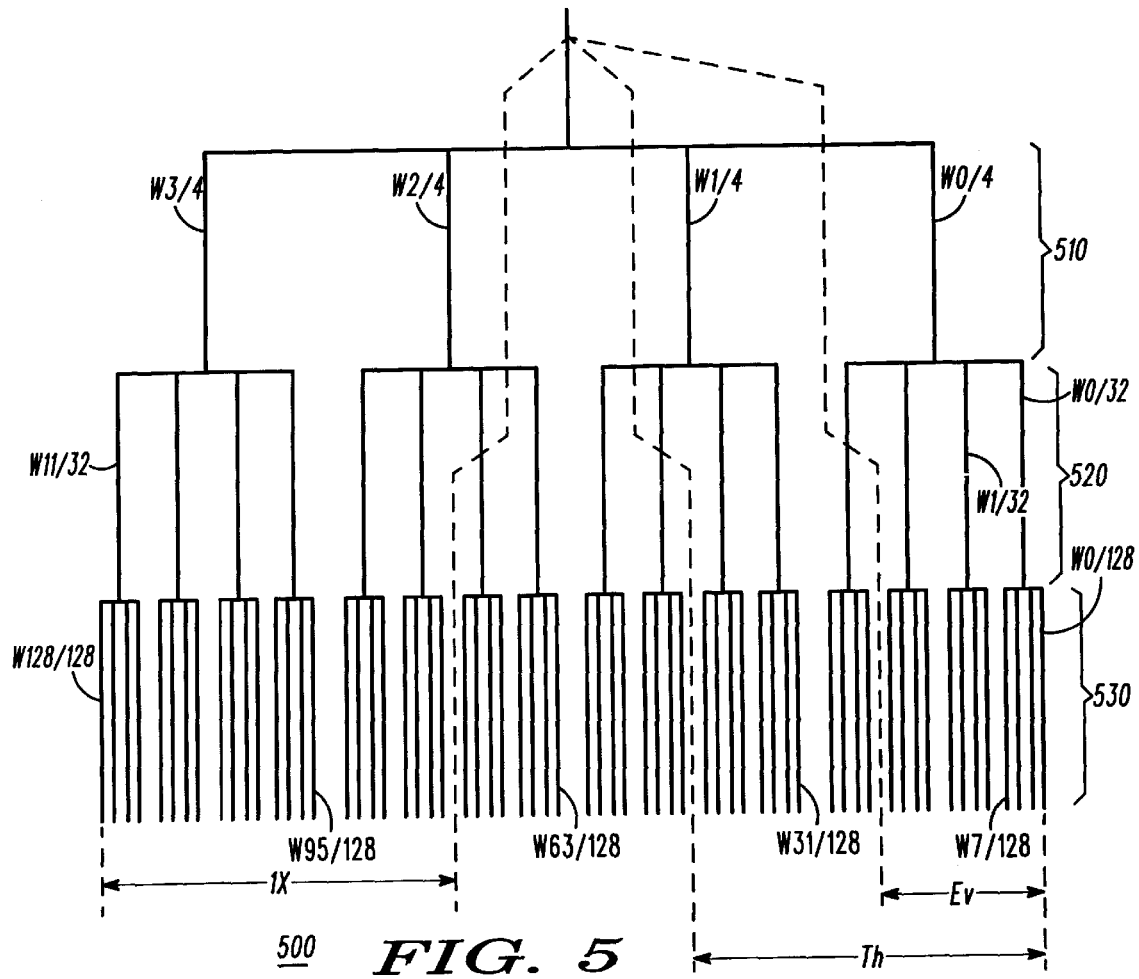
FIG. 5 is a visual representation of a code spectrum of Walsh codes.

To partition Walsh codes between the 1X protocol and the EV/DV protocol, a Walsh code tree 500 as shown in FIG. 5 may be used to allocate a number of Walsh codes used for calls operating in accordance with the 1X protocol (1X) and a number of Walsh codes used for calls operating in accordance with the EV/DV protocol (Ev). In particular, the Walsh code tree 500 generally includes a first level 510, a second level 520, and a third level 530. The first level 510 may include four Walsh codes, i.e., Walsh codes W0 through W3. The second level 520 may include 32 Walsh codes, i.e., Walsh codes W0 through W31. The third level 530 may include 128 Walsh codes, i.e., Walsh codes W0 through W127. To optimize Walsh codes used by the 1X protocol and the EV/DV protocol, a branch of Walsh codes associated with a lower level may need to be fully utilized before more another branch of Walsh codes associated with a higher level may be available. That is, the second level 520 is a lower level relative to the first level 510 but it is a higher level relative to the third level 530 whereas the third level 530 is a lower level relative to both the first and second levels 510, 520. Accordingly, for example, the Walsh codes of the third level 530 stemming from the Walsh code W0/32 of the second level 520 (i.e., W0/128 through W7/128) must be used before the Walsh codes on the third level 530 stemming from the Walsh code W1/32 of the second level 520 (i.e., W8/128 through W15/128) may be available. In another example, the Walsh codes of the second and third levels 520, 530 stemming from the Walsh code W0/4 of the first level 510 (i.e., W0/32 through W7/32, and W0/128 through W30/128) must be used before the Walsh codes of the second and third levels 520, 530 stemming from the Walsh code W1/4 may be available. Based on whether the base station controller 120 detects at least one condition of the wireless communication system 100 suggesting a potential for improved system performance, a threshold of Walsh codes allocated for calls to operate in accordance with the EV/DV protocol (i.e., the EV/DV threshold (Th)) may either decrease or increase as described in detail below.

Thus, referring back to FIG. 4, the base station controller 120 in box 445 determines whether the number of calls operating in accordance with the EV/DV protocols, i.e., EV/DV calls (Ev), by the second base station 142 is less than the EV/DV threshold (Th). If the number of Walsh codes used for calls operating in accordance with the EV/DV protocol is greater than or equal to the EV/DV threshold (i.e., Ev>=Th), then the mobile station 160 and the base station 142 may continue to operate in accordance with the 1X protocol in box 420, and the base station controller 120 may reduce the EV/DV threshold (Th) in box 450 to allocate more communicate resources for the 1X protocol. In particular, a fine threshold counter at box 450 may reduce the EV/DV threshold (Th). For example, the fine threshold counter may reduce the EV/DV threshold (Th) by 1, which in turn, may be divided at box 480 by a dampening factor such as 16. To illustrate this concept, the EV/DV threshold (Th) may be 49 Walsh codes. Accordingly, the fine threshold counter at box 450 may increment the EV/DV threshold (Th) down by one to produce a reduced number of 48. At box 480, the reduced number of 48 may be divided by a dampening factor of 16. Because the reduced number of 48 may be divisible by 16 to produce a whole number (i.e., a whole number of 3) at box 485, the EV/DV threshold (Th) at box 490 may shift to the right on the Walsh code tree 500 to reduce the potential number of Walsh codes available for the EV/DV protocol. As a result, more communication resources (i.e., Walsh codes) may be available to be allocated to the 1X protocol, i.e., 1X may potentially shift to the right as well. On the other hand, if the fine threshold counter reduces the EV/DV threshold (Th) by one, and the reduced number (i.e., Th-1) is not divisible by the dampening factor to produce a whole number then the EV/DV threshold (Th) may not be reduced. Continuing from the above example, the EV/DV threshold (Th) is now 48, and the fine threshold counter may increment the EV/DV threshold (Th) down by one to a reduced number of 47. Here, the reduce number of 47 may not divisible by the dampening factor of 16 to produce a whole-number quotient. Thus, the EV/DV threshold (Th) may not shift to the right to reduce the number of Walsh codes available for the EV/DV protocol until the reduced number is divisible by the dampening factor to produce a whole-number quotient (e.g., a reduced number of 32).

Referring back to box 445, if the base station controller 120 determines that the number of Walsh codes used for calls operating in accordance with the EV/DV protocol is less than the EV/DV threshold (i.e., Ev<Th), then in box 460, the base station controller 120 (e.g., via the first base station 140) may transmit a notification message to the mobile station 160. For example, the base station controller 120 may transmit a handoff message from the first base station 140 via a forward dedicated control channel (F-DCCH) to the mobile station. The handoff message may notify the mobile station 160 to operate in accordance with the EV/DV protocol as shown in box 465. Accordingly, the first base station 140 may handoff coverage responsibility to the second base station 142 so that the second base station 142 may provide communication service to the mobile station 160 in accordance with the EV/DV protocol. Further, the base station controller 120 via the fine threshold counter in box 470 may increase the EV/DV threshold (Th) to allocate more communication resources for the EV/DV protocol. In particular, the fine threshold counter may increment the EV/DV threshold (Th) by one to produce an increased number. For example, the EV/DV threshold (Th) may be 71 Walsh codes so the fine threshold counter may increment the EV/DV threshold (Th) by one to produce an increased number of 72. At box 480, the increased number of 72 may be divided by the dampening factor of 16. Because the increased number of 72 is divisible by 16 then the EV/DV threshold (Th) may shift to the left on the Walsh code tree 500 to allocate more communication resources for the EV/DV protocol. On the other hand, the fine threshold counter may increase the EV/DV threshold (Th) by one but the increased number (i.e., Th+1) may not be divisible by the dampening factor to produce a whole number then the EV/DV threshold (Th) may not be increased. Following the above example, the EV/DV threshold (Th) may now be 72, and the fine threshold counter may increase the EV/DV threshold (Th) by one to produce an increased number of 73. Because the increased number of 73 is not divisible by the dampening factor of 16 to produce a whole-number quotient, the EV/DV threshold (Th) may not shift to the left to increase the number of Walsh codes available for the EV/DV protocol. Until enough calls are operating in accordance with the EV/DV protocol, no more Walsh codes may be allocated for the EV/DV protocol (i.e., the EV/DV threshold (Th) may not increase). Accordingly, more communication resources may be available for the 1X protocol.

Figure 6:
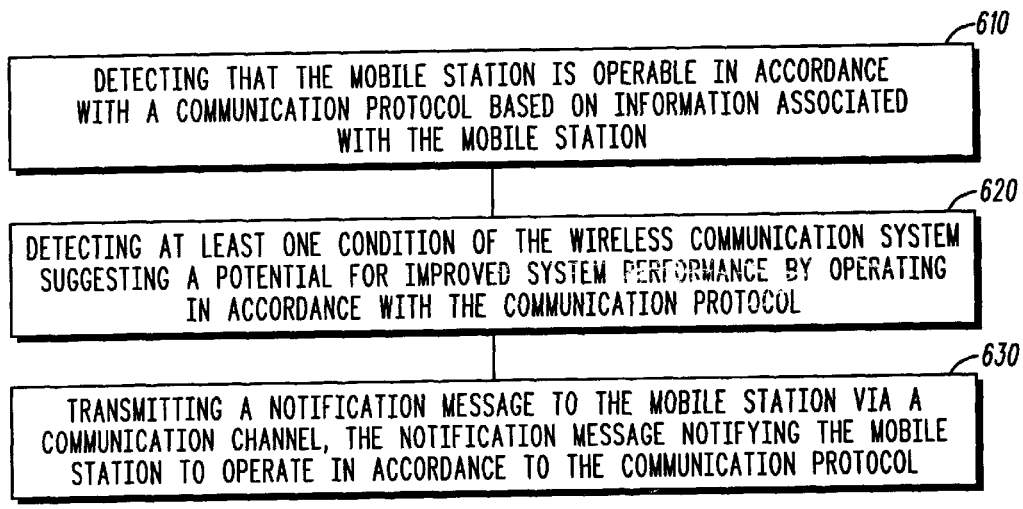
FIG. 6 is a flow diagram illustrating a method for operating in accordance with a wireless communication protocol.

One possible implementation of the computer program executed by the base station controller 120 (e.g., via the processor 350) is illustrated in FIG. 3. Persons of ordinary skill in the art will appreciate that the computer program can be implemented in any of many different ways utilizing any of many different programming codes stored on any of many computer-readable mediums such as a volatile or nonvolatile memory or other mass storage device (e.g., a floppy disk, a compact disc (CD), and a digital versatile disc (DVD)). Thus, although a particular order of steps is illustrated in FIG. 6, persons of ordinary skill in the art will appreciate that these steps can be performed in other temporal sequences. Again, the flow chart 600 is merely provided as an example of one way to program the base station controller 120 to switch a base station and a mobile station to operate in accordance with one wireless communication protocol over to another. The flow chart 600 begins at step 610, wherein the base station controller may determine whether a mobile station is operable in accordance with the second communication protocol based on information associated with the mobile station. Upon detection that the mobile station is operable in accordance with the second communication protocol, the base station controller at step 620 may monitor for at least one condition of the wireless communication system suggesting a potential for improved system performance by operating in accordance with the second communication protocol. For example, the base station controller may detect a condition of the wireless communication system suggesting a potential for such as, but not limited to, an increase in communication resources available, an increase in data throughput, and a reduction in interference. Upon detecting at least one condition of the wireless communication system suggesting a potential for improved performance by operating in accordance with the second communication protocol, the base station controller at step 630 may transmit a handoff message from the first base station to the mobile station via a communication channel. In particular, the handoff message may notify the mobile station to operate in accordance with the second communication protocol.

Although much of the above discussion has focused on communicating in accordance with either the 1X protocol or the EV/DV protocol, persons of ordinary skill in the art will appreciate that mobile stations operating in accordance with other communications protocols may be used without departing from the scope or spirit of this disclosure.

Many changes and modifications to the embodiments described herein could be made. The scope of some changes is discussed above. The scope of others will become apparent from the appended claims.

What is claimed is:

1. In a wireless communication system, wherein a plurality of base stations includes a first base station operable in accordance with a first communication protocol and a second base station operable in accordance with a second communication protocol, and wherein a mobile station is operating in accordance to the first communication protocol, a method for operating a call in accordance with the second communication protocol, the method comprising:
   detecting that the mobile station is operable in accordance with the second communication protocol based on information associated with the mobile station;
   detecting at least one condition of the wireless communication system suggesting a potential for improved system performance by operating in accordance with the second communication protocol; and
   transmitting a notification message from the first base station to the mobile station via a communication channel, the notification message notifying the mobile station to operate in accordance to the second communication protocol.

2. The method of claim 1, wherein the step of detecting that the mobile station is operable in accordance with the second communication protocol based on information associated with the mobile station comprises detecting that the mobile station is operable in accordance with the second communication protocol based on a device identifier associated with the mobile station, the device identifier being stored within one of a home location register (HLR), a status message, and a message associated with service negotiation.

3. The method of claim 1, wherein the step of detecting the mobile station being operable in accordance with the second communication protocol comprises detecting the mobile station being operable in accordance with the second communication protocol during service negotiation between the mobile station and the second base station.

4. The method of claim 1, wherein the step of detecting a condition of the wireless communication system suggesting a potential for improved service by operating in accordance with the second communication protocol comprises detecting a condition of the wireless communication system suggesting a potential for an increase in communication resources available.

5. The method of claim 1, wherein the step of detecting a condition of the wireless communication system suggesting a potential for improved service by operating in accordance with the second communication protocol comprises detecting a condition of the wireless communication system suggesting a potential for a reduction in interference.

6. The method of claim 1, wherein the step of detecting a condition of the wireless communication system suggesting a potential for improved service by operating in accordance with the second communication protocol comprises detecting a condition of the mobile station suggesting a potential for an increase in data throughput.

7. The method of claim 1, wherein the step of transmitting a notification message from the first base station to the mobile station comprises transmitting a handoff message from the first base station via a forward dedicated control channel (F-DCCH) to the mobile station.

8. The method of claim 1, wherein the first communication protocol comprises a code division multiple access (CDMA) 2000 1X communication protocol, and wherein the second communication protocol comprises a code division multiple access (CDMA) 1X-EV/DV communication protocol.

9. The method of claim 1, wherein the call is one of a voice call, a data call, and a multimedia call.

10. In a wireless communication system, wherein a plurality of base stations includes a first base station operable in accordance with a code division multiple access (CDMA) 2000 1X communication protocol and a second base station operable in accordance with a CDMA 1X-EV/DV communication protocol, and wherein a mobile station initiated a call operating in accordance with CDMA 2000 1X communication protocol, a method for switching from the CDMA 2000 1X communication protocol to operate in accordance with the CDMA 1X-EV/DV communication protocol, the method comprising:
   detecting that the mobile station is operable in accordance with the CDMA 1X-EV/DV communication protocol based on information associated with the mobile station;
   detecting a condition of the wireless communication system suggesting a potential for an increase in communication resources available;
   detecting a condition of the mobile station suggesting a potential for an increase in data throughput;
   detecting a condition of the mobile station suggesting a potential for a reduction in forward aggregate power consumed by the mobile station;
   transmitting a handoff message from the first base station to the mobile station via a communication channel, the handoff message notifying the mobile station to operate in accordance with the CDMA 1X-EV/DV communication protocol; and
   adjusting a threshold in response to the mobile station operating in accordance with the CDMA 1X-EV/DV communication protocol, the threshold being associated with a number of communication resources available for the CDMA 1X-EV/DV communication protocol.

11. The method of claim 10, wherein the step of adjusting a threshold in response to the mobile station operating in accordance with the CDMA 1X-EV/DV communication protocol comprises adjusting a threshold based on a dampening factor in response to the mobile station operating in accordance with the CDMA 1X-EV/DV communication protocol.

12. In a wireless communication system, wherein a plurality of base stations includes a first base station operable in accordance with a first communication protocol and a second base station operable in accordance with a second communication protocol, and wherein a mobile station is operating in accordance to the first communication protocol, wherein a base station controller is operable to switch from the first communication protocol to the second communication protocol, the base station controller comprising:
   a memory; and
   a processor operatively coupled to the memory, the processor being programmed to detect that the mobile station is operable in accordance with the second communication protocol based on information associated with the mobile station, the processor being programmed to detect at least one condition of the wireless communication system suggesting a potential for improved system performance by operating in accordance with the second communication protocol; and the processor being programmed to transmit a notification message from the first base station to the mobile station via a communication channel, notification message notifying the mobile station to operate in accordance to the second communication protocol.

13. The base station controller of claim 12, wherein the information associated with the mobile station is one of a device identifier stored within a home location register (HLR), a device identifier stored within a status message, and a device identifier stored within a message associated with service negotiation.

14. The base station controller of claim 12, wherein one of the plurality of conditions of the wireless communication system suggesting a change from the first communication protocol to the second communication protocol is a condition of the mobile station suggesting a potential for an increase in communication resources available.

15. The base station controller of claim 12, wherein one of the plurality of conditions of the wireless communication system suggesting a change from the first communication protocol to the second communication protocol is a condition of the wireless communication system suggesting a potential for a reduction in interference.

16. The base station controller of claim 12, wherein one of the plurality of conditions of the wireless communication system suggesting a change from the first communication protocol to the second communication protocol is a condition of the mobile station suggesting a potential for an increase in data throughput.

17. The base station controller of claim 12, wherein the notification message is a handoff message via a forward dedicated control channel (F-DCCH).

18. The base station controller of claim 12, wherein the first communication protocol is a code division multiple access (CDMA) 2000 1X communication protocol, and wherein the second communication protocol is a code division multiple access (CDMA) 1X-EV/DV communication protocol.

19. In a wireless communication system, wherein a plurality of base stations includes a first base station operable in accordance with a first communication protocol and a second base station operable in accordance with a second communication protocol, wherein a mobile station initiated a call in accordance to the first communication protocol, wherein a processor operates in accordance with a computer program embodied on a computer-readable medium for operating the call in accordance with the second communication protocol, the computer program comprising:

a first routine that directs the processor to detect that the mobile station is operable in accordance with the second communication protocol based on information associated with the mobile station;

a second routine that directs the processor to detect at least one condition of the wireless communication system suggesting a potential for improved system performance by operating in accordance with the second communication protocol; and a third routine that directs the processor to transmit a handoff message from the first base station to the mobile station via a communication resource so that the mobile station is operable in accordance to the second communication protocol.

20. The computer program of claim 19, wherein the first routine comprises a routine that directs the processor to detect that the mobile station is operable in accordance with the second communication protocol based on a device identifier associated with the mobile station, the device identifier being stored within one of a home location register (HLR), a status message, and a message associated with service negotiation.

21. The computer program of claim 19, wherein the first routine comprises a routine that directs the processor to detect the mobile station being operable in accordance with the second communication protocol during service negotiation between the mobile station and the second base station.

22. The computer program of claim 19, wherein the second routine comprises a routine that directs the processor to detect a condition of the wireless communication system suggesting a potential for an increase in communication resources available.

23. The computer program of claim 19, wherein the second routine comprises a routine that directs the processor to detect a condition of the wireless communication system suggesting a potential for a reduction in interference.

24. The computer program of claim 19, wherein the second routine comprises a routine that directs the processor to detect a condition of the wireless communication system suggesting a potential for an increase in data throughput.

25. The computer program of claim 19, wherein the third routine comprises a routine that directs the processor to transmit a handoff message from the first base station to the mobile station via a forward dedicated control channel (F-DCCH).

26. The computer program of claim 19, wherein the first communication protocol is a code division multiple access (CDMA) 2000 1X communication protocol, and wherein the second communication protocol is a code division multiple access (CDMA) 1X-EV/DV communication protocol.

27. The computer program of claim 19, wherein the medium is one of paper, a programmable gate array, application specific integrated circuit, erasable programmable read only memory, read only memory, random access memory, magnetic media, and optical media.

* * * * *